(No Model.)
C. WILLMS & G. A. LIEBIG, Jr.
ELECTRIC BATTERY.
No. 421,801. Patented Feb. 18, 1890.
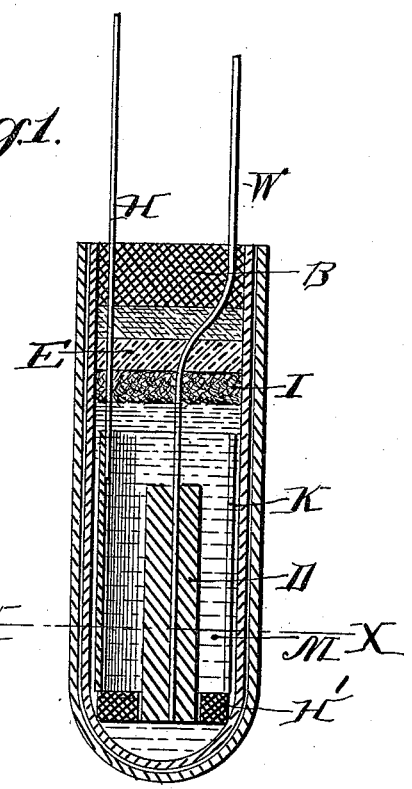
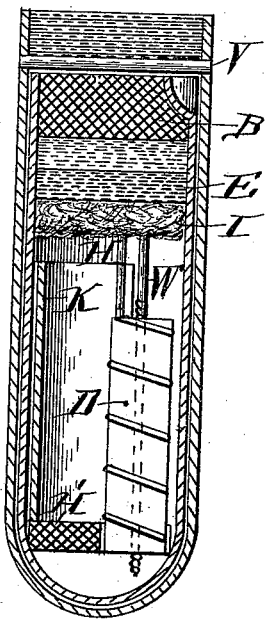
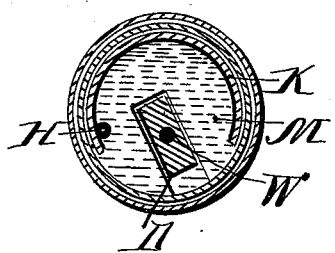
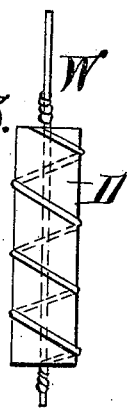
Witnesses
Inventors
Gustav A. Liebig Jr.
Charles Willms
Chas. S. Whitman.
Attorney

UNITED STATES PATENT OFFICE.

CHARLES WILLMS AND GUSTAV A. LIEBIG, JR., OF BALTIMORE, MARYLAND, ASSIGNORS TO THE JOHN A. BARRETT BATTERY COMPANY, OF SAME PLACE.

ELECTRIC BATTERY.

SPECIFICATION forming part of Letters Patent No. 421,801, dated February 18, 1890.

Application filed October 31, 1889. Serial No. 328,771. (No model.)

*To all whom it may concern:*

Be it known that we, CHARLES WILLMS and GUSTAV A. LIEBIG, Jr., citizens of the United States, residing at Baltimore, in the State of Maryland, have invented certain new and useful Improvements in Electric Batteries; and we do hereby declare the following to be a full, clear, and exact description of the invention, such as will enable others skilled in the art to which it appertains to make and use the same.

Our invention relates to electric batteries; and the nature thereof consists in obviating difficulties which have heretofore existed in their construction and operation by providing means whereby their electro-motive force shall be invariable by securing an effective seal therefor, and also by rendering them stronger in construction and more efficient in action, as will be hereinafter described.

In the accompanying drawings, in which corresponding parts are designated by similar letters, Figure 1 is a vertical section of a chloride-of-silver battery containing our invention. Fig. 2 is a transverse section on the line $x x$ of Fig. 1. Fig. 3 is a side elevation of a mass of chloride of silver attached to a battery-wire, and Fig. 4 is a vertical section of a chloride-of-silver battery in which the cell of the glass case is enough shorter than the surrounding metal casing to allow a certain amount of some absorbent material to be placed above the cell.

The battery-cell, which consists of a vessel of glass or other suitable material closed by an air-tight stopper, contains a plate, flat or circular, of zinc K, a plate or rod of chloride of silver D, and a solution of sulphate of zinc M. The negative plate K of the cell may be flat or in the form of a circular cylinder slit lengthwise, and to this zinc plate a copper wire H, covered afterward by some insulating material, is attached, which copper wire forms externally the negative pole of the cell. The silver or positive electrode D consists of a mass of chloride of silver, the mass being fused about a length of pure silver wire W. A conductor, which is made preferably of a wire of silver, is wrapped spirally about the chloride of silver, and is connected at both ends with the battery-wire W. The silver wire itself forms the positive electrode of the cell and projects beyond the air-tight stopper. In order to prevent the zinc plate and the mass of silver chloride from coming in contact with each other, thus producing a short circuit within the cell, the chloride of silver is always separated from the zinc plate by means of a plate or disk of insulating material H', such as hard rubber or gutta-percha. In general, one of these insulating-disks placed near the lower end of the plate of silver chloride is sufficient, since the air-tight stopper, through which are passed the electrodes, will effectually keep the upper ends of the zinc plate and silver chloride apart. The two electrodes K and D are immersed in a solution, saturated or otherwise, of sulphate of zinc M, which is the active fluid of the cell.

Above the zinc-sulphate solution a stopper or sealing is arranged, which prevents the contents of the cell, whether gaseous or liquid, from reaching the outside.

The stopper consists of several parts—that is to say, first, above the solution of sulphate of zinc M is placed a layer of some insulating material I—such as gutta-percha, raw cotton, or similar substance—the object of which is to form a foundation for the remainder of the stopper which is above the said layer of insulating material. The second part E of the stopper consists of some hard substances—such, for instance, as a mixture of gutta-percha and resin—which is introduced into the cell when hot, and in a semi-fluid condition. The third part of the stopper consists of a viscous fluid—such as a mixture of resin and resin-oil—which always remains semi-fluid and serves the purpose of filling up any cracks or fissures which may form in the stopper either during manufacture or subsequently. Finally, above the viscous fluid is a hard material B, which practically forms the resisting part of the stopper or sealing of the cell. This consists, generally, of plaster-of-paris or a mixture of charcoal and shellac, though many other substances would be available for the purpose.

In order to guard against any possibility of the stopper being forced out from the cell by the action of such gases as may be formed or from other causes, the internal surface of the chamber holding the plates and zinc-sulphate solution is roughened or serrated near the top. By this means the plaster-of-paris or charcoal mixture, which is applied when plastic and soft, by filling up these cavities, forms a more perfect contact with the interior surface of the cell.

In order to prevent the gases which form during a rapid discharge of the cell from bursting the envelope of the cell-case, it has been found advisable to surround the latter, which is usually made of glass, by a section of metal tube closed at one end and extending at the other end somewhat beyond the cell-case. The cell after being completed is dipped into a bath of material which has the property of adhering to glass and metal, and some of this material is dropped into the metal case. The cell is then pushed within the metal case and moved in and out, so as to free the interspace between the cell and the metal case from air-bubbles. After this a sufficient quantity of the material is placed on the top of the cell to completely fill up the metal tube. The material thus acts as a hard dense cushion around the cell, which entirely fills up the space between the cell and metal tube and prevents the former from moving out of place even under great pressure. Through the top of the material project the two electrodes of the cell. The material we have used with success is sodium silicate, generally called "soluble glass," though other mixtures or cements may also be employed. In some cases we have provided the metal case with a cap for greater security; but usually the sealing above referred to furnishes all the strength necessary. In other cases a metal pin is fastened to the shell above the glass cell, or the upper projecting end has been cut longitudinally a short distance, the flaps thus formed being bent over the cell and kept in place by means of solder. As a further safeguard, the metal tube is in some cases allowed to project beyond the cell-case proper for some distance, as shown in Fig. 4. The space thus secured is filled with some absorbent material, so that even should the cell burst or be broken its contents will be absorbed and prevented from reaching the outside. This material placed above the cell may be thick blotting-paper, absorbent cotton, prepared felt, or some equivalent substance. The glass cell itself is held down by the sodium silicate and the strong metal pin V, secured to the metal tube, as shown in Fig. 4. The absorbent material surrounds the cell-wires and fills up whatever vacant space may be left.

We do not claim a seal for an electric battery having a mass of adherent sticky material in a viscous or semi-fluid condition in which the battery-wires are embedded, as that feature is described in Letters Patent of the United States No. 374,862, granted to John A. Barrett, December 13, 1887.

What we claim as our invention is—

1. A seal or stopper for an electric battery, consisting of a mass of adherent material in a viscous or semi-fluid condition in which the battery-wires are embedded, a superimposed solid stopper, and a hard substance arranged below the adherent material, forming the foundation for the stopper, as and for the purposes described.

2. A seal for an electric battery, consisting of a foundation of insulating material, a layer of some hard substance which is introduced into the cells when in a semi-fluid condition, a viscous fluid, and a superimposed solid stopper, as and for the purposes described.

3. In an electric battery, the combination of a zinc plate, a mass of fused chloride of silver having a conducting-wire embedded therein, a solution of zinc sulphate in which the elements are immersed, and an insulated piece between the chloride of silver and the zinc, as and for the purposes described.

4. In an electric battery, the combination of a glass cell having its internal surface roughened or serrated and a stopper or sealing composed of some material which possesses the property of hardening after being applied to the cell, as plaster-of-paris, as and for the purposes described.

5. In an electric battery, the combination of a glass cell, a metal casing therefor, and a cushion between the glass cell and metal casing composed of material which has the property of adhering to the glass cell and metal casing, as and for the purposes described.

6. In an electric battery, the combination of a glass cell, a metal casing therefor projecting beyond the top of the cell, and absorbent material placed within the casing above the said cell, as and for the purposes described.

7. In an electric battery, the combination of a glass cell, a metal casing therefor, a projection beyond the top of the cell, and a pin crossing the interior of the said casing and securing the cell in position, as and for the purposes described.

In testimony whereof we have affixed our signatures in presence of two witnesses.

CHAS. WILLMS.
GUSTAV A. LIEBIG, Jr.

Witnesses:
GEO. P. SHERMAN,
SAMUEL S. BOGGS.